United States Patent Office 3,838,148
Patented Sept. 24, 1974

3,838,148
PROCESS FOR THE INDUSTRIAL PREPARATION OF DESOXYRIBONUCLEIC ACIDS OF HIGH MOLECULAR WEIGHT
Karl Christen, Niederurnen, Switzerland, assignor to Rephamac A.G., Niederurnen, Switzerland
No Drawing. Filed Apr. 11, 1972, Ser. No. 243,070
Claims priority, application Switzerland, Apr. 16, 1971, 5,598/71
Int. Cl. C07d 51/50
U.S. Cl. 260—211.5 R            9 Claims

ABSTRACT OF THE DISCLOSURE

A process for preparing highly polymerized desoxyribonucleic acids from fish milt and the like from which lipides have been removed and which has been treated with an alkali salt including the steps of treating with a solution of phenol in such quantity as to saturate the mass containing the nucleo-protein material to liberate DNA therefrom.

---

The present invention relates to an industrial process for the preparation of highly polymerized desoxyribonucleic acids, known as DNA.

The starting material which is most commonly employed in industry is fish milt, the high desoxyribonucleic acid content of which has long been known. In spermatozoids, DNA is combined with basic proteins, histons or protamins, which it is desirable to eliminate. It is conventional to effect the elimination of the lipides by means of conventional solvents, such as 90° Bé. alcohol and acetone, and to effect the degradation of the proteins by means of caustic soda or sodium chloride employed in high concentration. Some industrial processes have in addition utilized the action of heat for effecting the separation of the proteins, but it then becomes difficult to avoid the risks inherent in the action of the heat in the separation of the two chains of the DNA molecule by breakage of the bases which form bridges between them, even if cooling is thereafter applied with the object of bringing about a re-pairing, which is difficult to control, of the two chains of the molecule.

It is also generally known that the presence of phenol favors the separating action of the proteins in relation to the nucleic acids and that DNA has been produced in the laboratory by treating nucleo-protein suspensions with an equal volume of pure phenol. However, the conditions of treatment in these laboratory processes do not permit carrying out manufacture under sufficiently economic and practical conditions to justify an industrial application.

The work which has led up to the present invention has made it possible to determine certain conditions in which satisfactory industrial yields can be obtained.

In accordance with the invention, the treated substances, freed from their lipides and previously subjected to the action of sodium chloride, are treated by a process having the following features:

As the protein-eliminating agent for liberating the DNA, phenol is employed, not in the pure state and not in a large excess as in some laboratory processes, but only in a quantity sufficient to ensure that the mass containing the nucleo-protein material in suspension is saturated with phenol, plus a slight excess. A small excess of phenol intentionally added to the whole thus saturated facilitates the denaturation and the slow precipitation of the liberated protein and the bringing of the DNA into solution.

Before the elimination of the protein by the action of phenol, the treated substance is treated with a 2 M sodium chloride solution, to which there has preferably been added a small quantity of sodium fluoride to inhibit the nucleases. This saline treatment has the effect of liberating the nucleo-protein molecules and of promoting the subsequent action of the phenol.

After treatment with phenol, there is added to the viscous DNA solution, containing the denatured protein in suspension, a substance such as bentonite, celite, an infusorial earth or the like, in order to facilitate the separation by any physical means such as sedimentation, filtration on a filter press or centrifuging. Preferably, celite is employed in the presence of bentonite, the latter product having a protecting action against nucleases.

Throughout the process, the temperature is preferably below 25° C., and in any case well below that which is likely to produce a degradation of the molecule (about 80° C.).

As an example of manufacture, the following procedure may be followed:

EXAMPLE OF MANUFACTURE 100 kg. of "herring" milt, frozen at −25° C., are coarsely chopped and treated with half their volume of alcohol (95° Bé.). The alcohol eliminates a considerable fraction of lipides, which varies in accordance with the type of fish from which the milt emanates.

The crushed mass obtained is left in contact with the alcohol at ambient temperature for a minimum of 24 hours, whereafter it is drained and then suction-filtered on a filter press (the solvent being recovered).

The filtered residue, which is again more finely crushed, is brought into contact with three times its volume of a 2 M sodium chloride solution containing 0.045 M of sodium fluoride. The thick liquid, which is already very viscous, is slowly agitated for about one hour. This agitation is repeated a number of times before the following operating phase:

After 24 to 48 hours, at ambient temperature, the volume is doubled with distilled water saturated with freshly distilled phenol (75 g. of phenol per liter of water), to which there has been added a sufficient quantity of phenol to ensure complete saturation of the whole constituted by the phenolic suspension, i.e. an excess of phenol of 25 g. per liter.

The degree of phenol saturation of the water, in accordance with the temperature, is given in the Tables of Constants.

The mixture is then carefully homogenized by agitation for 15 minutes, which is repeated several times in 24 hours.

There are then added to the viscous DNA solution containing in suspension the denatured proteins a little bentonite and a larger quantity of celite, which has the effect of bringing about a slow sedimentation of the protein fraction. Notably, it is possible to employ 1% of celite and 0.5% of bentonite in suspension in distilled water in a sufficient quantity to make up the total volume to 1,000 liters.

The mixture is allowed to stand for one or more days, which enables the denatured protein to separate by sedimentation. The process may be accelerated or completed by passage through a filter press or by centrifuging.

The supernatant liquid or the filtrate, either clear or slightly turbid, is poured into an equal volume of alcohol (95° Bé.). The polymerized DNA precipitates in the form of long white fibers. These fibers are collected and then washed with alcoholic solutions of increasing titer in order to eliminate the entrained sodium chloride and the excess of phenol. The operation is completed by washing in alcohol (95° Bé.), and the product is dried on a ventilated screen with the aid of moderate heating or under a partial vacuum.

The polymerized DNA yield is excellent. It is of the order of 5% of the treated mass. Analysis gave the following mean results: 15% of moisture, 11.50% to 13% of nitrogen, 7.1% to 7.8% of phosphorus, and less than 0.5% of residual protein. The specific absorption $\epsilon/P$ in ultra-violet light was of the order of 6,400 to 6,800. The hyperchromicity varied from 28% to 36%. The molecular weight, determined by diffusion of light, was always higher than $2.5 \times 10^6$.

I claim:

1. A process for obtaining highly polymerized DNA (desoxyribonucleic acids) from natural living substances containing same, such as fish milt consisting essentially of extracting lipides therefrom by solvent extraction, treating the lipide-free material with an aqueous alkali salt solution to form a suspension in which nucleo-protein molecules are liberated, adding to the suspension an aqueous phenol solution containing 75 gms. of phenol per liter in an amount to furnish a slight excess of the phenol necessary to saturate those proteins present for denaturation thereof and to form a solution of the DNA, separating the suspended denatured proteins from the dissolved DNA and precipitating the DNA.

2. A process as claimed in claim 1 in which there is added to the total suspension of nucleo-protein material in the aqueous phenol solution about 25 g. of phenol per liter.

3. A process as claimed in claim 1 wherein the alkali salt solution is an aqueous solution of sodium chloride and sodium fluoride.

4. A process as claimed in claim 3 wherein the alkali salt solution contains 2 M of sodium chloride and 0.045 M of sodium fluoride per liter.

5. A process as claimed in claim 1 wherein the removal of the suspended denatured proteins from the dissolved DNA is accomplished by adding an adjuvant comprising at least one material selected from the group consisting of bentonite, celite and infusorial earth to the suspension.

6. A process as claimed in claim 5 wherein said adjuvant comprises celite and a lesser amount of bentonite.

7. A process as claimed in claim 6 wherein said adjuvant comprises an aqueous suspension of 1% celite and 0.5% bentonite.

8. A process as claimed in claim 1 wherein the steps of the process are carried out at a temperature below 80° C.

9. A process as claimed in claim 1 wherein the steps of the process are carried out at a temperature below 25° C.

References Cited
UNITED STATES PATENTS 3,594,278   7/1971   Naylor _____ 260—211.5 R
3,661,893   5/1972   Spiegelman et al. _ 260—211.5 R JOHNNIE R. BROWN, Primary Examiner